UNITED STATES PATENT OFFICE.

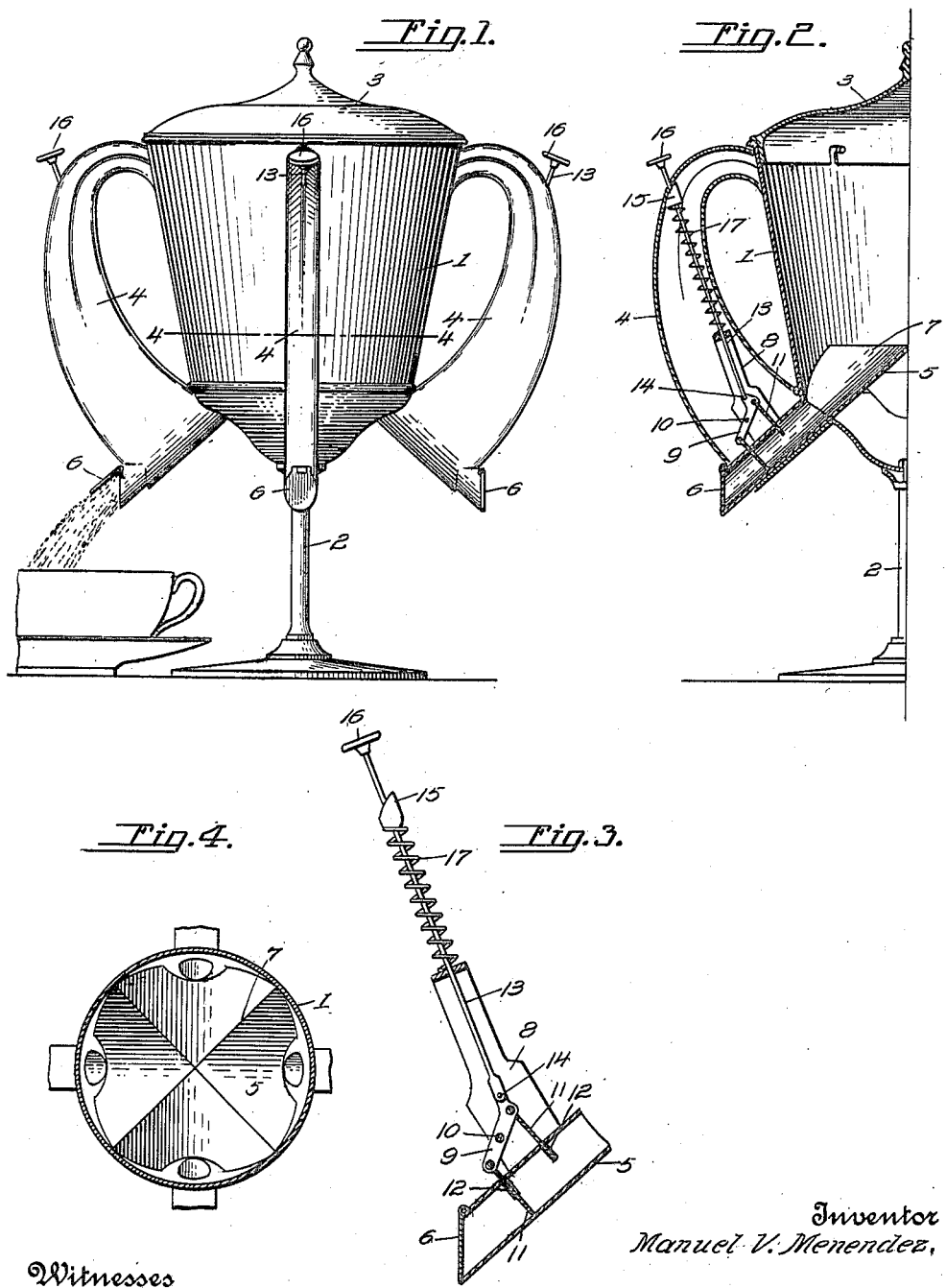

MANUEL VAZQUEZ MENENDEZ, OF CAMAGUAY, CUBA.

DISPENSING SUGAR-BOWL.

1,281,991. Specification of Letters Patent. Patented Oct. 15, 1918.

Application filed March 15, 1918. Serial No. 222,673.

*To all whom it may concern:*

Be it known that I, MANUEL VAZQUEZ MENENDEZ, a citizen of Spain, residing at Camaguay, in the country of Cuba, have invented new and useful Improvements in Dispensing Sugar-Bowls, of which the following is a specification.

This invention relates to new and useful improvements in dispensing apparatus and the principal object of the invention is to provide a device from which a measured quantity of sugar or the like can be discharged at will.

Another object of the invention is to provide a bowl having a plurality of handles thereon for adding to the attractive appearance thereof, said handle having arranged therein the operating means.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the invention.

Fig. 2 is a longitudinal section through one-half of the device.

Fig. 3 is an enlarged detail view.

Fig. 4 is a section on line 4—4 of Fig. 1.

As shown in these views the invention comprises a bowl 1 provided with a supporting stand 2 and a removable cover 3. 4 indicates a series of handles connected with the top and bottom of the bowl as shown. Each handle has a delivery chute 5 passing through its lower end with the extreme outer end of said chute projecting from the side of the handle, where said chute is closed by a hinged flap 6, said flap being hinged at its upper end so that it will remain closed by gravity. The inner end of the chute extends to the center of the bowl and each chute is provided with flaring portions 7 so that the contents of the bowl is directed to the chutes. 8 indicates a bracket located in each handle and secured to the upper side of the chute. 9 indicates a lever pivoted at 10 to the bracket and 11 indicates a pair of sliding valves pivoted to the lever 9, one at each end thereof. These valves engage with slots 12 formed in the upper walls of the chute and spaced apart as shown. 13 represents a rod passing through a hole in the upper end of the bracket 8 and pivoted to the upper end of the lever 9 as at 14. The outer end of said rod is provided with an enlargement 15 and a handle 16. 17 indicates a spring located between the bracket 8 and said enlargement 15 and tending to hold the rod 13 in its uppermost position. It will thus be seen that when the rod 13 is pressed inwardly the inner valve will be lowered to close the chute while the outer valve will be raised to permit the sugar located in the space between the valves to flow from the chute, it being understood that the weight of the sugar will raise the flap 6. When the rod 13 is released the spring 17 will return the parts to normal position so as to permit the sugar to fill the space between the two valves. Thus a certain amount of sugar will be discharged each time the rod is operated. While the drawing shows an operating device in each handle it is of course understood that such a device may be used on one of the handles if desired.

It is thought from the foregoing description that the advantages and novel features of my invention will be readily apparent.

I desire it to be understood that I may make slight changes in the construction and in the combination and arrangement of the several parts, provided that such changes fall within the scope of the appended claims.

What I claim is:—

1. A device of the class described comprising a bowl, a plurality of chutes leading therefrom, said chutes having their inner ends flaring upwardly and the flaring portions of one chute engaging the flaring portions of the adjacent chutes, and means for controlling the outlet of sugar from the chutes.

2. A device of the class described comprising a bowl, a handle for said bowl, a chute leading from the bowl through the lower end of said handle, a set of controlling valves for the chute, a lever pivoted in the handle intermediate its ends and having each end engaging one of the valves, and a spring controlled rod pivoted to said lever and having its upper end passing through said handle.

In testimony whereof I affix my signature.

MANUEL VAZQUEZ MENENDEZ.